Jan. 9, 1934.   L. E. HOLMAN   1,942,644
WHEEL SUSPENSION FOR VEHICLES
Filed Dec. 3, 1930   2 Sheets-Sheet 1
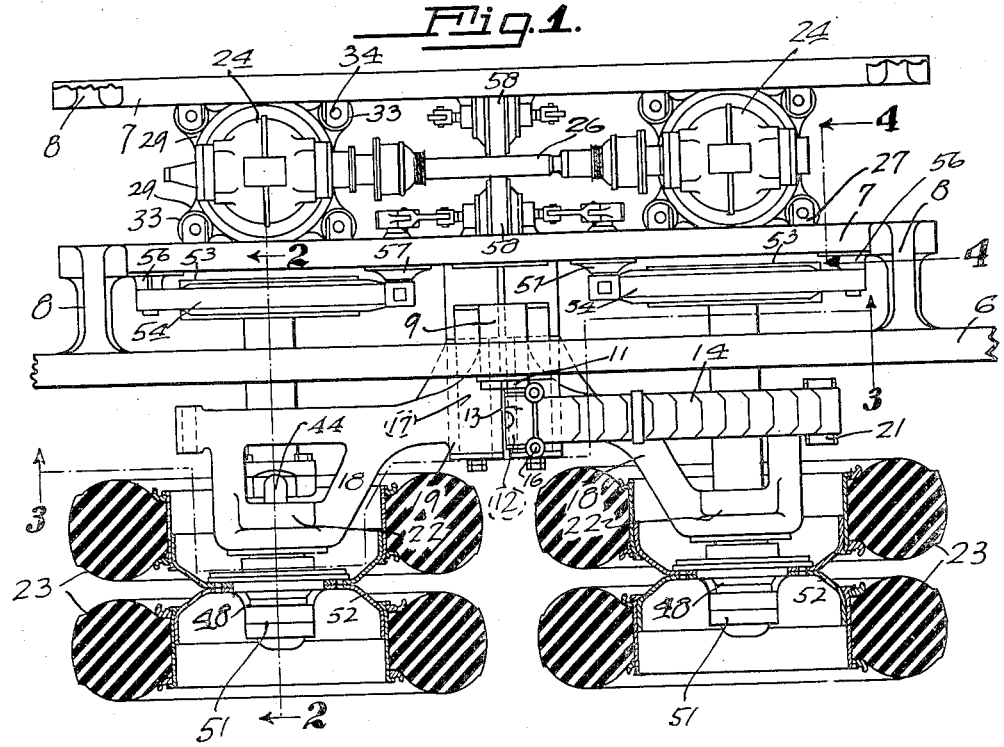
INVENTOR.
LEWIS E. HOLMAN
BY
ATTORNEY.

Jan. 9, 1934.  L. E. HOLMAN  1,942,644
WHEEL SUSPENSION FOR VEHICLES
Filed Dec. 3, 1930  2 Sheets-Sheet 2
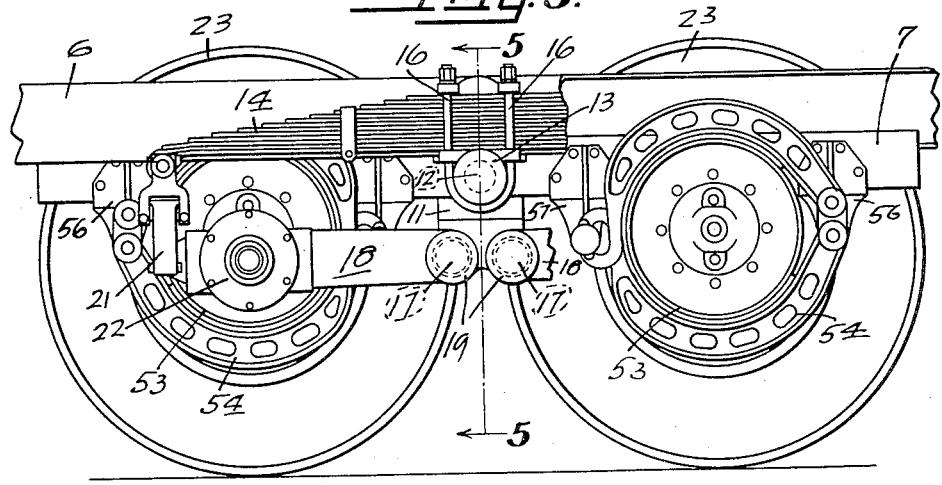
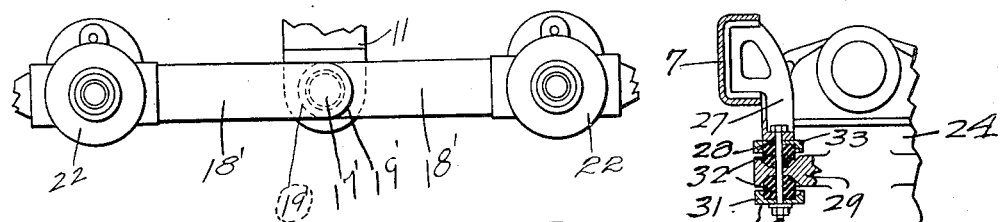
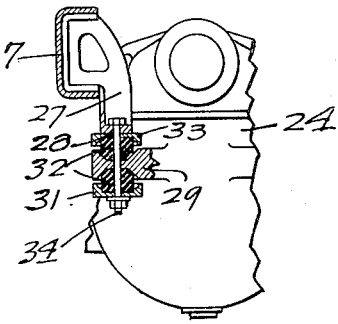
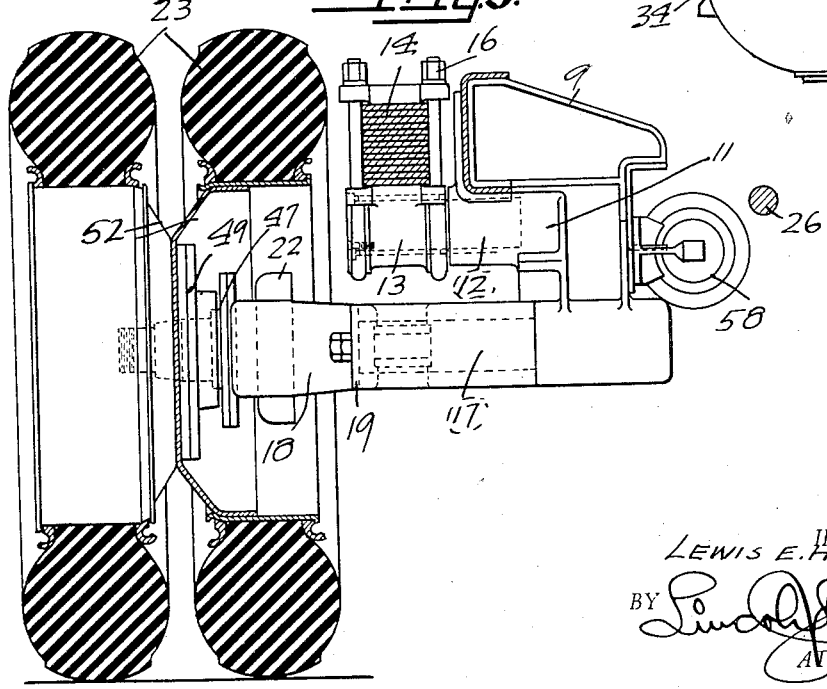
INVENTOR,
LEWIS E. HOLMAN
BY Lincoln Johnson
ATTORNEY.

Patented Jan. 9, 1934

1,942,644

UNITED STATES PATENT OFFICE 1,942,644

WHEEL SUSPENSION FOR VEHICLES

Lewis E. Holman, Oakland, Calif.

Application December 3, 1930. Serial No. 499,719

1 Claim. (Cl. 280—124)

This invention relates to wheel suspension for vehicles.

It is the primary object of the invention to establish a connection between the tandem wheels of a vehicle and the frame, whereby each wheel may change its position around a fixed fulcrum, and in a vertical plane, without effecting the position of the other wheels, a flexible connection being provided between the wheels and a driving mechanism, to permit the substantially fixed supporting of the driving mechanism, and the driving axles relatively to the wheels, yet allowing the aforementioned movement of the wheels.

Another object of the invention is to provide a brake mechanism particularly adapted for use on the driving mechanism at the connections of flexible driving elements thereto, which driving elements are rotatively connected to the wheels of the vehicle, the wheels in turn being flexibly connected to the vehicle frame so as to be movable around fulcrums located between the tandem wheels.

Another object of the invention is the provision of a suspension for tandem wheels of a vehicle, in which a resilient equalizing bar is fulcrumed intermediate its ends, on each side of the vehicle frame, the ends of said bar being connected to the free ends of oppositely extending rocker arms and having their fulcrumed ends located substantially below the equalizing bar fulcrum, and having the vehicle wheels mounted thereon at points intermediate their ends, nearer to the free ends thereof, whereby said wheels are permitted to move around the arm fulcrum or fulcrum against the action of the equalizing bar, independently of each other.

Other objects and advantages are to provide a wheel suspension for vehicles that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms; and it is also to be understood that in and by the claim following the description, it is desired to cover the invention in whatsoever form it may be embodied.

The invention is clearly illustrated in the accompanying drawings, wherein

Fig. 1 is a plan view of the wheel suspension, on one side of the frame, and the driving mechanism therefor;

Fig. 2 is a sectional view of the wheel driving and suspending mechanism, the section being taken on the line 2—2 of Fig. 1;

Fig. 3 is a longitudinal sectional view of the wheel suspension, the section being taken on the line 3—3 of Fig. 1;

Fig. 4 is a fragmental sectional view of the resilient mounting of the driving mechanism, the section being taken on the line 4—4 of Fig. 1;

Fig. 5 is a cross sectional view of the device, the section being taken on the line 5—5 of Fig. 3; and Fig. 6 is a fragmental detail view of a pivoted rocker arm arrangement showing another embodiment.

In carrying out my invention I make use of a frame 6, on which is fixedly mounted a narrower auxiliary frame 7, by means of brackets 8. The longitudinal members of the frames are constructed preferably of channels. The auxiliary frame is disposed at a level below the frame 6, with the top of the former substantially in the plane of the underside of the latter. On each side of the vehicle, between the two frames is provided a bracket 9, so formed as to be secured into the channel of frame 6 at one side thereof, and the other side thereof resting on the top of the frame 7. In the depending portion 11 of the bracket 9 is fixed a pivot pin 12 which extends beyond the side of the frame 6 and has a saddle 13 rockably mounted thereon, without freedom of axial movement.

On the saddle 13 is fixedly mounted a resilient equalizing bar 14, by means of U bolts 16. The equalizing bar 14, in the present illustration, is a leaf spring, which is thus fulcrumed intermediate its ends.

In the depending portion 11 of the bracket 8, and beneath the pivot 13, are fixedly held pins 17 spaced from each other, but disposed in horizontal alignment with each other, to serve as fulcrums of the adjacent ends of oppositely extending rocker arms 18, which are thus permitted to rock around said fulcrums independently of each other. The fulcrumed ends 19 of the arms 18 are held against axial movement on the pins 17. The free ends of the arms 18 are connected by means of universal shackles 21, to the respective ends of the equalizing bar 14. It is to be noted that the outer ends of the arms 18 are bent away from the sides of the frame 7 so as to provide a fixed wheel gauge. Between the ends of each arm 18, near to the free end thereof, is formed a bearing 22 on which is rotatably mounted the vehicle wheel, in this instance, a double wheel 23. In this manner the frame is resiliently supported on said wheels, the load on the wheels being equalized by the action of the fulcrumed equalizing bar 14. In the event one of the tandem wheels 23 hits a bump and is raised or lowered thereby, it is moved on an arc around the fulcrum of the respective arm 18. The action of such wheel displacement is not transferred directly to the frame, because it is taken up by the corresponding resilient rocking of the equalizing bar 14, transferring the load equally on the tandem wheels. The expansion, or straightening of one end of the bar 14, causes the bar to rock, and also transfers the stress upon the other end of the bar, and to the wheel 23 thereat. Consequently, sudden jerks and jars, due to unevenness of the road or the like, are absorbed, and the vehicle frame is carried without any undue oscillation.

In this illustration the wheel suspension is shown in connection with a four wheel drive unit, that is each wheel 23 is driven by a driving mechanism. The driving mechanism comprises two differentials 24, connected to each other by a transmission shaft 26 and suitably connected to a prime mover, not shown. The differentials 24 are mounted on brackets 27 secured to the frame 7, which brackets 27 depend below the underside of the frame 7 and terminate in flanges 28. The casing of each differential has four lugs 29 thereon formed with cup shaped depressions 31 on both horizontal sides thereof. Into these depressions 31 fit resiliently compressible pads 32 held in place by retainer plates 33 and by bolts 34 extending thru all the elements of the resilient mounting structure, into the flange 28, to secure the same together. The pads 32 are preferably made of rubber composition. The function of this type of mounting is to fixedly support the driving mechanism on the frame, yet provide for a certain limited creeping displacement of the differentials, due to the free movements of the other parts of the four wheel drive unit.

On the opposite sides of each differential extend differential shafts 36, having splined ends extending beyond the differential casing and beyond the frame 7, and carry a hub 37 thereon. On each hub 37 is mounted a pin element 38, diametrically to the end of the shaft 36, in which is swingably mounted a cross connecting element 39, on an end of a driving shaft section 41. Another driving shaft section 42 is telescopically held in the section 41, and has a cross member 43 on the free end thereof, to universally connect the shaft to the connection 44, on the splined end of a driving spindle 46. Thus, the driving spindle 46 is driven by the flexibly, or universally mounted drive shaft 41, which in turn is rotated by the differential shaft 36.

It is to be noted that the connection 44 rotatably extends into the bearing 22 of the respective arm 18. On said bearing 22 is fixedly attached a bearing sleeve 47, in which latter is rotatably supported the spindle 46. The bearing sleeve 47 tapers outwardly and has ball bearings 48 provided on the outer periphery thereof, on which ball bearings is rotatable a wheel hub 49, which is fixedly connected to the outer end of the spindle 46, by a cap 51. On the wheel hub 49 is fixedly mounted the disc 52 of the wheels 23. The spindle 46 is driven in the aforesaid manner, and rotated within the sleeve 47 of the arm bearing 22, and it rotates the wheels 23 thru a wheel hub 49, which is rotatably supported on the outer periphery of the bearing sleeves 47. In this manner the wheels 23 are rotatably mounted on the bearing 22 of the respective arm 18.

The driving of the wheels 23 by the fixed driving mechanism, therefore, is not hindered or retarded by the rocking support of said wheels. The fulcrum of the arms 18 is fixed against axial displacement, therefore the movement of the wheel is limited to an arc in a vertical plane around the respective arm fulcrum. It is to be noted that the driving shaft sections 41 and 42 are inclined downwardly, toward the supporting surface, hence when the wheel is raised or lowered the distance between the spindle 47 and the differential shaft 36 is slightly varied. This variation is taken up by telescoping of the shaft section 42 within the shaft section 41.

In order to provide a brake which operates at full efficiency in connection with the four wheel drive unit heretofore described, I provide a brake drum 53 which is fixedly mounted on the hub 37 and is rotated therewith by the differential shaft 36. This brake drum rotates in a fixed plane regardless of the oscillation of the wheels or of the frames. Around the outer periphery of the brake drum 53 are disposed the semicircular sections 54, properly lined to provide an external contracting brake thereat. One end of the brake sections 54 is pivotally mounted on a bracket 56 depending from the inner frame 7. The free ends of the brake sections 54 are operatively connected to a similar bracket 57 and are actuated by a hydraulic brake applying mechanism 58, suitably connected to the free ends of the brake sections 54 of the bracket 57.

It will be recognized that the brake mechanism is particularly adapted to cooperate with the rockably suspended wheels, and frame; the driving mechanism is also fixed so as to allow for slight displacement, and the wheels are supported with freedom of movement around the fulcrum of independent rocking arms, the free ends of which are acting upon the ends of fulcrumed resilient, equalizing bars, thereby providing a complete efficient four wheel driving unit for vehicles, which is simple in construction, positive in operation, and carries the frame of the vehicle with ease and without transferring thereto any jars, or excessive vibration.

In the embodiment shown in Fig. 6, the ends of the arms 18' are fulcrumed on a pin 17' common to both arms 18'. The pin 17' is disposed in the depending portion 11 of the bracket 8 and beneath the pivot 13 similarly to pivots 17. The fulcrumed ends 19' of the arms 18' are thus held against axial movement on the same pin 17'. Otherwise the arms 18' are constructed and operate similarly to the arms 18. When this last mentioned embodiment is used, the wheels are permitted to move around the same fulcrum, common to both of the tandem wheels.

Having thus described this invention, what I claim and desire to secure by Letters Patent is:

In a road vehicle, a frame, an auxiliary inner frame spacedly secured to the first frame, brackets supported on and between the opposite sides of the said frames, a fulcrum member extended outwardly from each bracket, an equalizing bar fulcrumed intermediate its ends on each fulcrum member, a pair of arms fulcrumed on the bracket below the said fulcrum member, the arms in each pair extending in opposite directions and being rockable toward and away from the plane of the frame; means to connect the free ends of the arms to the respective ends of the bar; and a wheel rotatably mounted on each arm between the free end and the fulcrum of the latter.

LEWIS E. HOLMAN.